(12) United States Patent
Lin et al.

(10) Patent No.: US 9,273,864 B2
(45) Date of Patent: Mar. 1, 2016

(54) EMITTING DEVICE USING SMART MOBILE ELECTRONIC DEVICE AS OPERATION INTERFACE

(71) Applicant: CONARY ENTERPRISE CO., LTD., Taipei (TW)

(72) Inventors: Wen-Wei Lin, Taipei (TW); Hsien-Cheng Yen, Taipei (TW)

(73) Assignee: Conary Enterprise Co., Ltd., Taipei (TW)

( * ) Notice: Subject to any disclaimer, the term of this patent is extended or adjusted under 35 U.S.C. 154(b) by 182 days.

(21) Appl. No.: 14/094,972

(22) Filed: Dec. 3, 2013

(65) Prior Publication Data

US 2015/0153008 A1 Jun. 4, 2015

(51) Int. Cl.
*F21K 99/00* (2010.01)
*F21V 33/00* (2006.01)
*G06F 1/16* (2006.01)
*F21Y 101/02* (2006.01)

(52) U.S. Cl.
CPC .......... *F21V 33/0052* (2013.01); *G06F 1/1626* (2013.01); *F21Y 2101/02* (2013.01); *F21Y 2101/025* (2013.01)

(58) Field of Classification Search
CPC ............ F21V 33/0052; F21Y 2101/02; F21Y 2101/025; G06F 1/1626
See application file for complete search history.

(56) References Cited

U.S. PATENT DOCUMENTS

| | | | |
|---|---|---|---|
| 6,341,871 B1 * | 1/2002 | Angelopoulos | H04M 1/21 362/109 |
| 7,086,748 B1 * | 8/2006 | Elembaby | F21V 33/0052 362/109 |
| 8,611,564 B1 * | 12/2013 | Yen | H01R 13/7175 381/124 |

* cited by examiner

*Primary Examiner* — Stephen F Husar
(74) *Attorney, Agent, or Firm* — Rosenberg, Klein & Lee

(57) ABSTRACT

An emitting device using smart mobile electronic device as operation interface comprises a connector having a circuit board, the circuit board having an electrical connection portion at a front end, and the electrical connection portion set to match specifications of a transmission port of a smart mobile electronic device for being inserted into the transmission port to get the power and signal; a light emitting module installed at a side of the circuit board; a drive circuit couple between the circuit board and light emitting module. Whereby when the connector of the emitting device is electrically connected to the transmission port, the power module provides the power to the emitting device to turn on or off the light emitting module of the emitting device through the user's operation interface on the touch screen.

10 Claims, 10 Drawing Sheets

EMITTING DEVICE USING SMART MOBILE ELECTRONIC DEVICE AS OPERATION INTERFACE

BACKGROUND OF THE INVENTION

1. Field of the Invention

The present invention relates to an emitting device using smart mobile electronic device as operation interface for getting power and signal.

2. Description of the Related Art

With the rapid development of computer and communications technology, electronic products have become increasingly popular; especially smart mobile electronic devices have become one of the essential devices of business people. At the same time, the industry continues to introduce new mobile phones with various functions for enhancing the convenience and practicality of mobile phones. For example, smart mobile phones have become the market mainstream and the various instant messaging, record cards, and other applications won the love of business people a lot. Moreover, smart mobile phones can proceed charging and data transfer through the open transmission port.

When business people make presentations, laser presenters are often required, and some laser presenter has hardware mouse or adjusted keys as an operation interface for projection function. Besides, the charging method requires either a USB port connected to an external power, or battery power.

The traditional laser pens and smart mobile phones disclosed in above prior art has following drawbacks:

1. While business people use the laser presenter for presentations, it is inconvenient to hold the smart mobile phone if an important message suddenly comes from the smart mobile phone.
2. The laser presenter uses the hardware operation interface to control the presentations, coupled with the USB port or batteries for charging, resulting in a large volume of laser presenter such that it is inconvenience to carry.
3. This transmission port of the smart mobile phone is open so that water or dust is easy to come into the transmission port, resulting damage of the smart mobile phones.

Therefore, there is room for improvement.

SUMMARY OF THE INVENTION

It is a primary objective of the present invention to provide an emitting device using smart mobile electronic device as an operation interface capable of getting power and signal by electrically connecting the connector thereof with the transmission port of the smart mobile electronic device.

Another objective of the present invention is to provide an emitting device using smart mobile electronic device as an operation interface, wherein the emitting device can be a lase presenter allowing the hardware operation interface to be written into the applications for turning on the laser presenter while starting the applications of the smart electronic mobile devices.

The other objective of the present invention is to provide an emitting device using smart mobile electronic device as an operation interface, wherein the emitting device has a connector can be permanently placed in the transmission port and can be used as a dust cover to increase the service life of electronic products or mobile phones.

To achieve the aforementioned objective, an emitting device using smart mobile electronic device as operation interface comprises a connector having a circuit board, the circuit board having an electrical connection portion at a front end, and the electrical connection portion set to match specifications of a transmission port of a smart mobile electronic device for being inserted into the transmission port to get the power and signal; a light emitting module installed at a side of the circuit board; a drive circuit couple between the circuit board and light emitting module; and a housing coating the circuit board and light emitting module, the electrical connection portion of the connector exposed at an inner side of the housing, and one side of the housing having a light-emitting hole for output light of the light emitting module to be projected.

Based on the features disclosed, the light emitting module includes a hollow tube; a light-emitting element installed in the hollow tube, and the light-emitting element having several terminals at a bottom end; and optical lens installed in the hollow tube and located in front of the light-emitting element. The light-emitting element includes a laser diode (LD) or light emitting diode (LED), and the light emitting diode includes a visible light-emitting diode (Visible LED) and an infrared light-emitting diode (Infrared LED).

Further, the smart mobile electronic device may include mobile phones, tablet computers, and PDA; the transmission port may include USB series port, or Apple Lightning connector produced by Apple Inc. The drive circuit is set on the circuit board or in the light emitting module.

Further, the light emitting module is set to be in the same direction with the connector or to be in a vertical direction with the connector. The light-emitting hole of the housing is a linear type or L-type, and the L-type light-emitting hole has a reflector of 45° inclination at a bend angle for the output light being 90° refracting to the predetermined direction.

In another embodiment, an emitting device using smart mobile electronic device as operation interface in which the smart mobile electronic device comprises a processor provided for controlling the operation of the smart mobile electronic device; a touch screen couple to the processor for showing information and being the user's operation interface; a wireless network module coupled to the processor; a memory module coupled to the processor, saving a user's operation interface program, and showing the operation interface on the touch screen; a power module coupled to the processor for providing the power to the smart mobile electronic device; a transmission port coupled to the power module and processor; wherein the emitting device includes: a connector having a circuit board, the circuit board having an electrical connection portion at a front end, and the electrical connection portion set to match specifications of the transmission port for being inserted into the transmission port to get the power and signal; a light emitting module installed at a side of the circuit board; a drive circuit couple between the circuit board and light emitting module; and a housing coating the circuit board and light emitting module, the electrical connection portion of the connector exposed at an inner side of the housing, and one side of the housing having a light-emitting hole for output light of the light emitting module to be projected; whereby when the connector of the emitting device is electrically connected to the transmission port, the power module provides the power to the emitting device to turn on or off the light emitting module of the emitting device through the user's operation interface on the touch screen.

Based on the features disclosed, the light emitting module is a laser light module for the emitting device becoming a laser presenter.

Based on the features disclosed, the present invention further comprises a host having a network connection program corresponding to the user's operation interface program for the touch signal of the operation interface to be transmitted to the host by the wireless network module; the host electrically connected to a display device for the presentations showing on the display device to be controlled by the operation interface. The operation interface includes a touch switch interface and a virtual mouse interface.

DETAILED DESCRIPTION OF THE PREFERRED EMBODIMENT

Figure 1A:
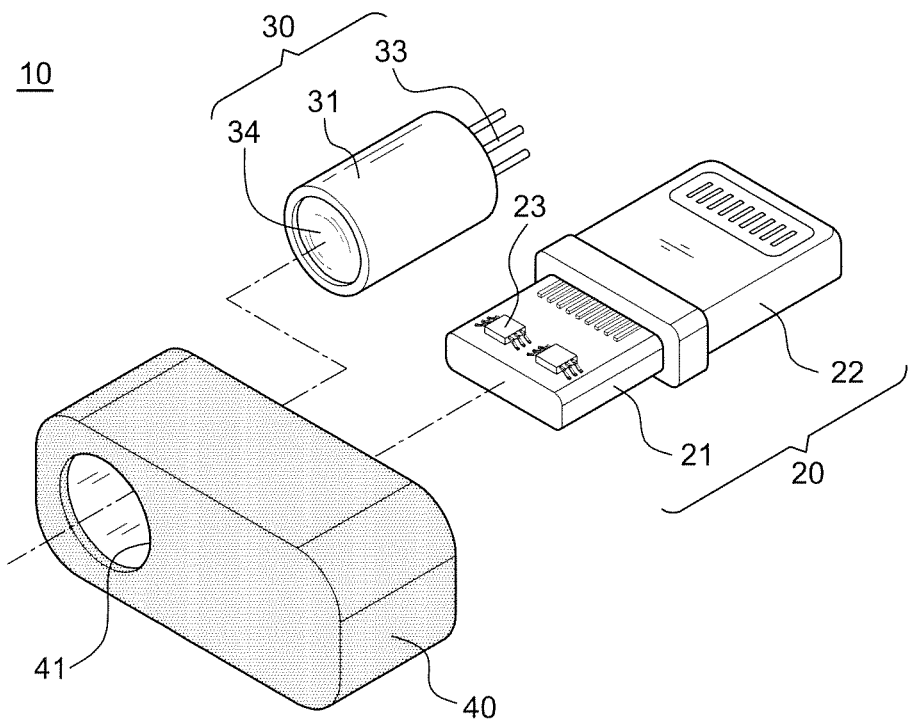
FIG. 1A is an exploded perspective view of emitting device in accordance with the present invention.
Figure 1B:
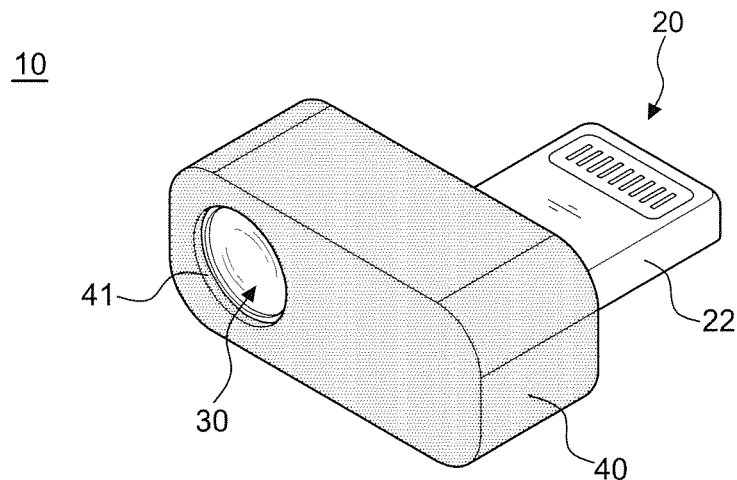
FIG. 1B is an assembly perspective view of emitting device in accordance with the present invention.

Referring to FIGS. 1A to 2C, the preferred embodiment of an emitting device 10 in accordance with the present invention comprises a connector 20 having a circuit board 21, the circuit board 21 having an electrical connection portion 22 at a front end, and the electrical connection portion 22 set to match specifications of a transmission port 51 of a smart mobile electronic device 50 for being inserted into the transmission port 51 to get the power and signal. In the embodiment, the transmission port 51 may include USB series port, or Apple Lightning connector produced by Apple Inc., and the smart mobile electronic device 50 may include mobile phones, tablet computers, PDA, and other related products which will not be described in details.

A light emitting module 30 is installed at a side of the circuit board 21. In the embodiment, the light emitting module 30 includes a hollow tube 31; a light-emitting element 32 installed in the hollow tube 31, and the light-emitting element 32 having several terminals 33 at a bottom end; optical lens 34 installed in the hollow tube 31 and located in front of the light-emitting element 32. The light emitting module 30, a mature product, is prior art, and thus the principle thereof will not be described in details. The present invention uses the light output function of the light emitting module 30 and characteristic of small volume to combine with the connector 20. In the embodiment, the light-emitting element 32 includes a laser diode (LD) or light emitting diode (LED), and the light emitting diode includes a visible light-emitting diode (Visible LED) and an infrared light-emitting diode (Infrared LED).

A drive circuit 23 is couple between the circuit board 21 and light emitting module 30. In the embodiment, the drive circuit 23 is set on the circuit board 21 but it is not a limitation. The drive circuit 23 can be set in the light emitting module 30.

A housing 40 coats the circuit board 21 and light emitting module 30, and the electrical connection portion 22 of the connector 20 is exposed at an inner side of the housing 40. One side of the housing 40 has a light-emitting hole 41 for output light of the light emitting module 30 to be projected. In the embodiment, the shape of the housing 40 matches to the outline of the smart mobile electronic device 50 for easy carrying and operation.

Figure 2A:
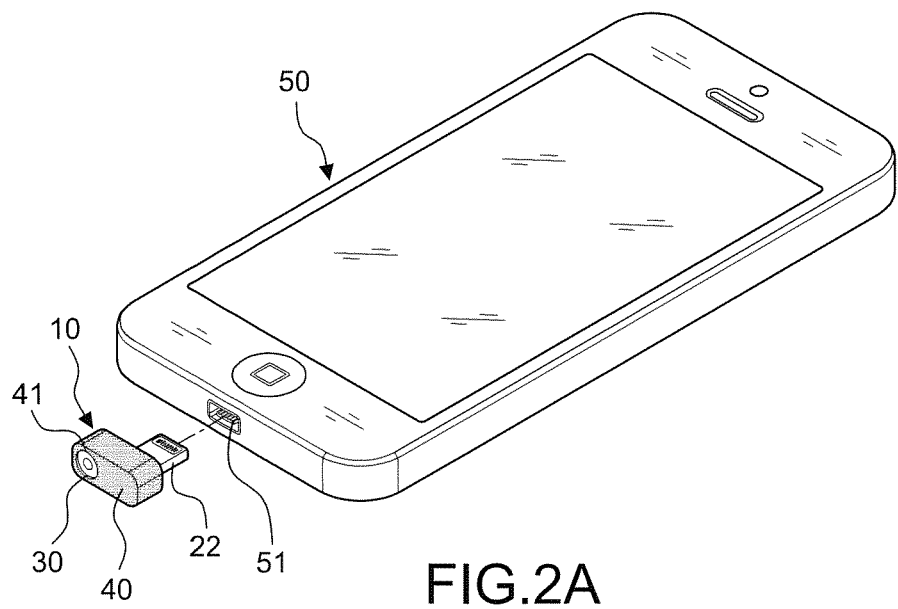
FIG. 2A is an exploded perspective view of emitting device and smart mobile electronic device in accordance with the present invention.
Figure 2B:
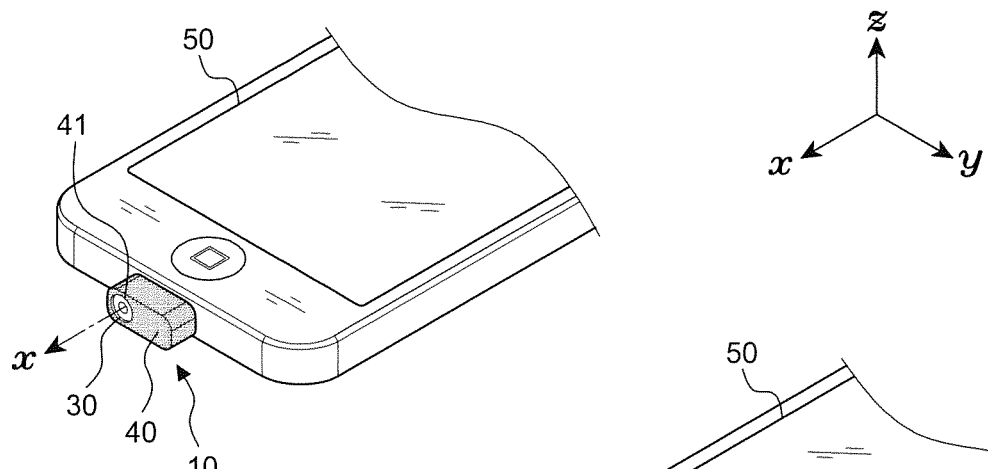
FIG. 2B is an assembly perspective view of emitting device and smart mobile electronic device in accordance with the present invention.
Figure 2C:
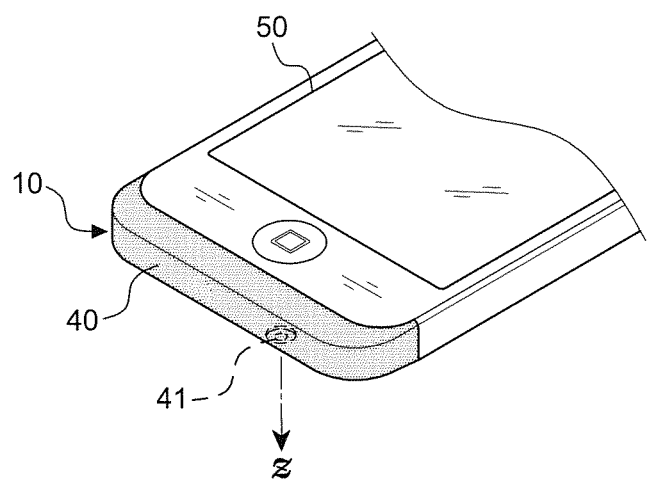
FIG. 2C is an assembly perspective view of the present invention, showing the shape of emitting device matching with the outline of smart mobile electronic device.
Figure 3A:
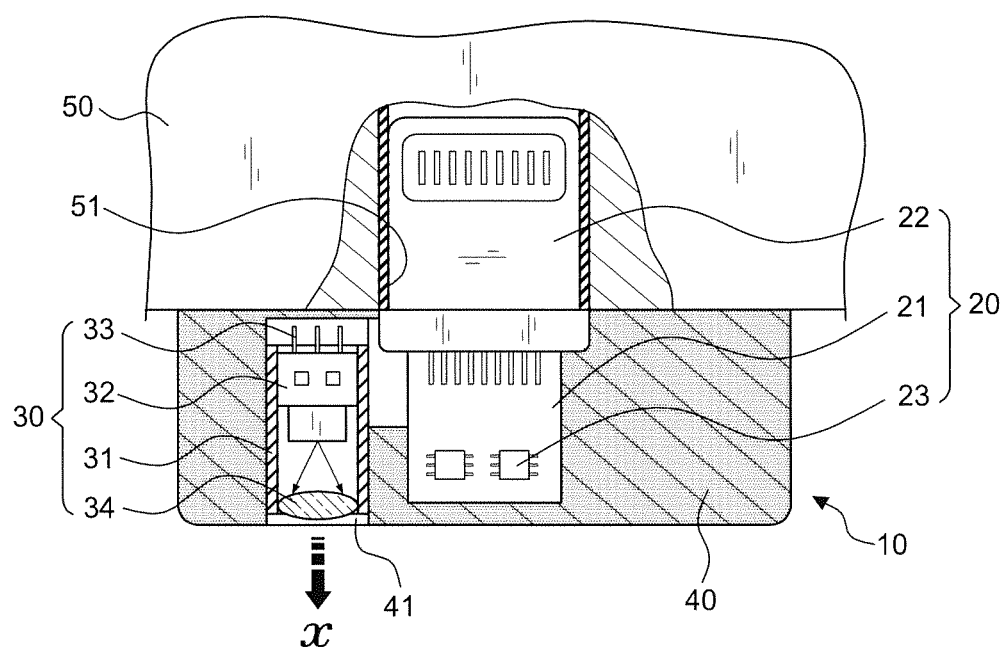
FIG. 3A is a partially sectional structure view of the present invention, showing the light-emitting module set to be in the same direction with the connector.

With the reference to FIGS. 2A, 2B and 3A, the light emitting module 30 in an applicable embodiment is set to be in the same direction with the connector 20, and the light-emitting hole 41 of the housing 40 is a linear type for the output light of the light emitting module 30 to be projected out in the X-axis direction. The transmission port 51 set at a tail end of the smart mobile electronic device 50 is electrically connected to the connector 20 of the emitting device 10; thus, when combining the smart mobile electronic device 50 and the emitting device 10, the output light of the light emitting module 30 is projected out in the X-axis direction.

Figure 3B:
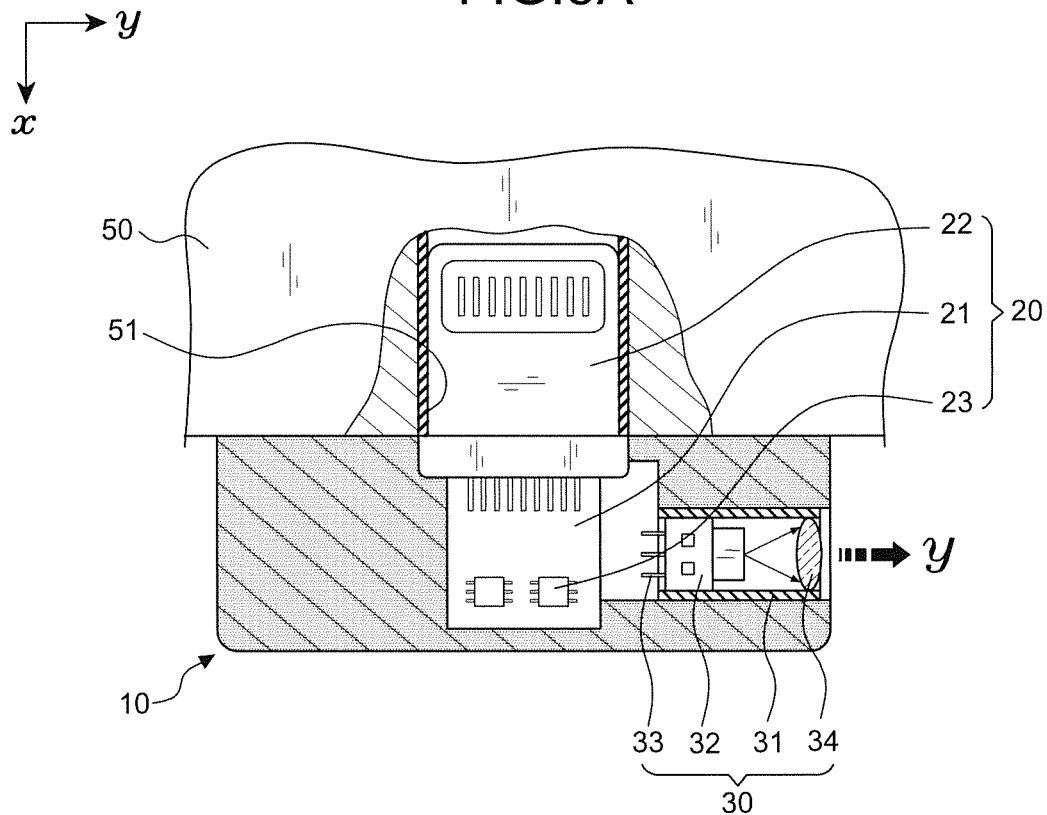
FIG. 3B is a partially sectional structure view of the present invention, showing the light-emitting module set to be in a vertical direction with the connector.
Figure 3C:
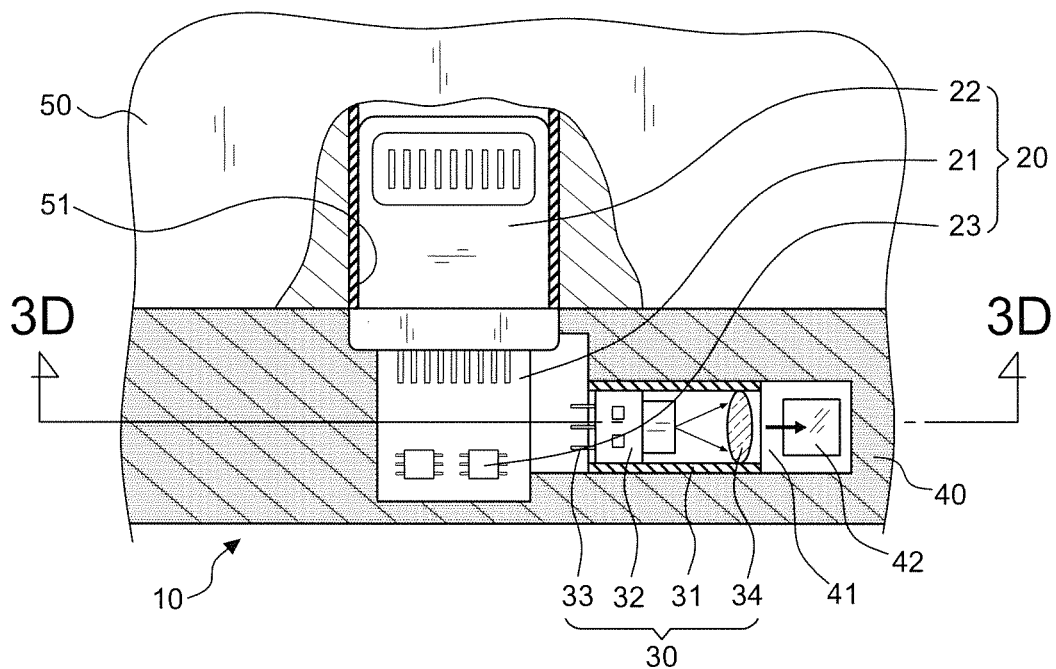
FIG. 3C is partially sectional structure view of light-emitting module and reflector in accordance with the present invention.
Figure 3D:
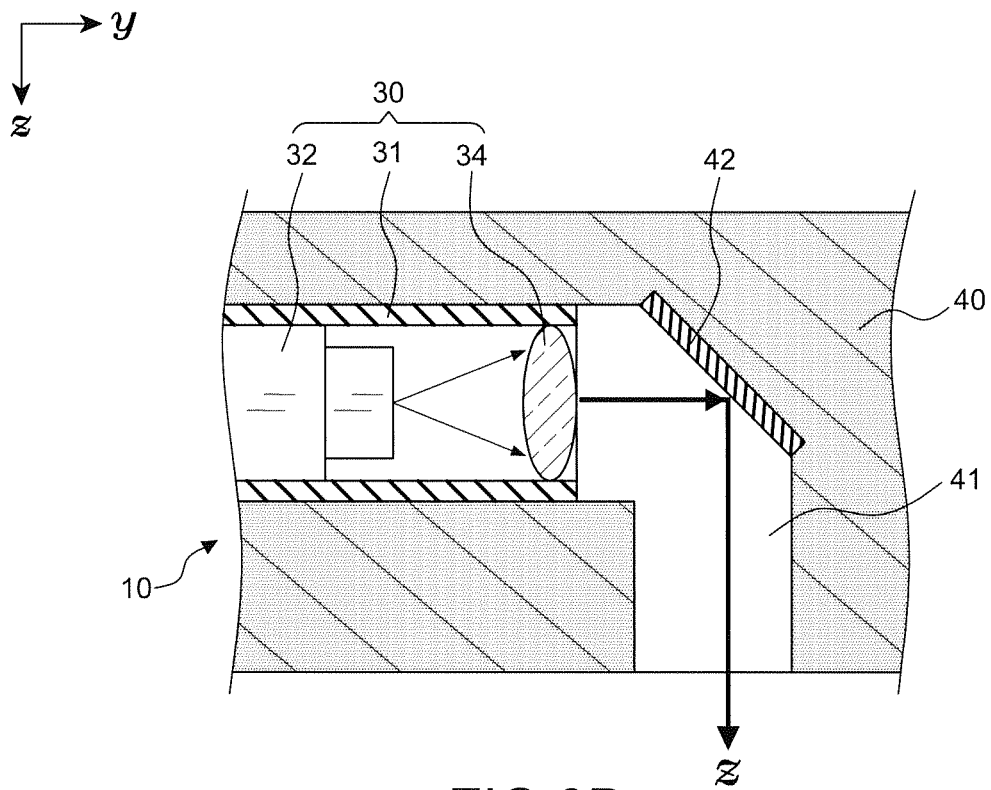
FIG. 3D is a cross-section view taken along the line 3D-3D in FIG. 3C.
Figure 4A:
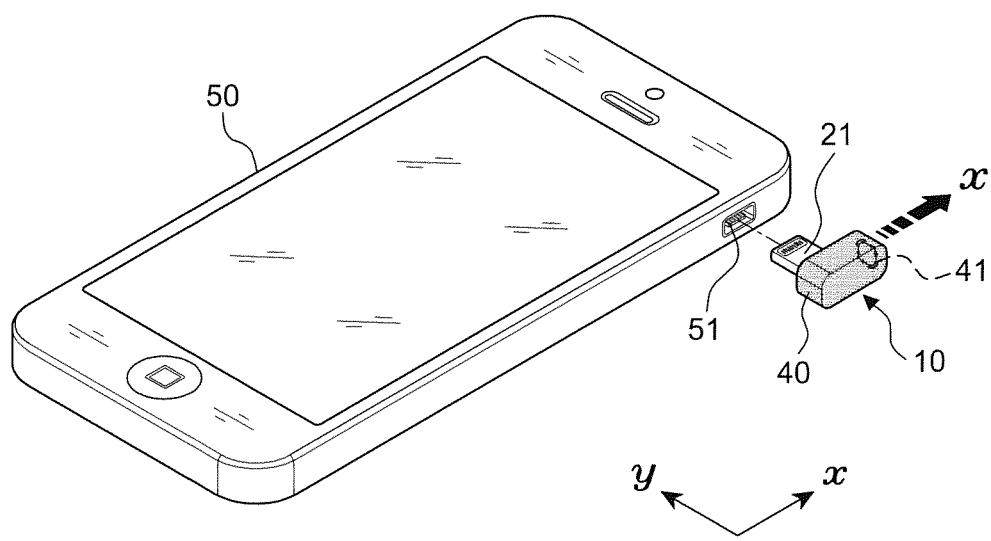
FIG. 4A is another exploded perspective view of emitting device and smart mobile electronic device in accordance with the present invention.
Figure 4B:
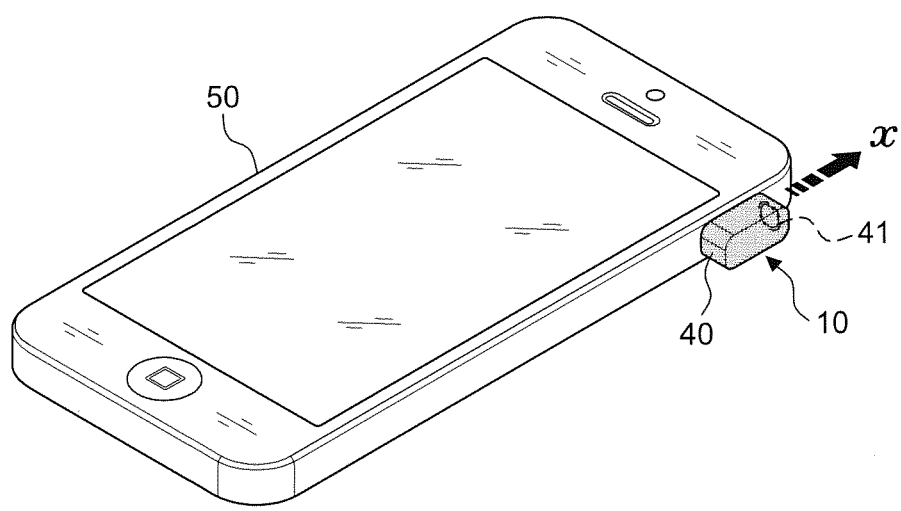
FIG. 4B is another assembly perspective view of emitting device and smart mobile electronic device in accordance with the present invention.
Figure 4C:
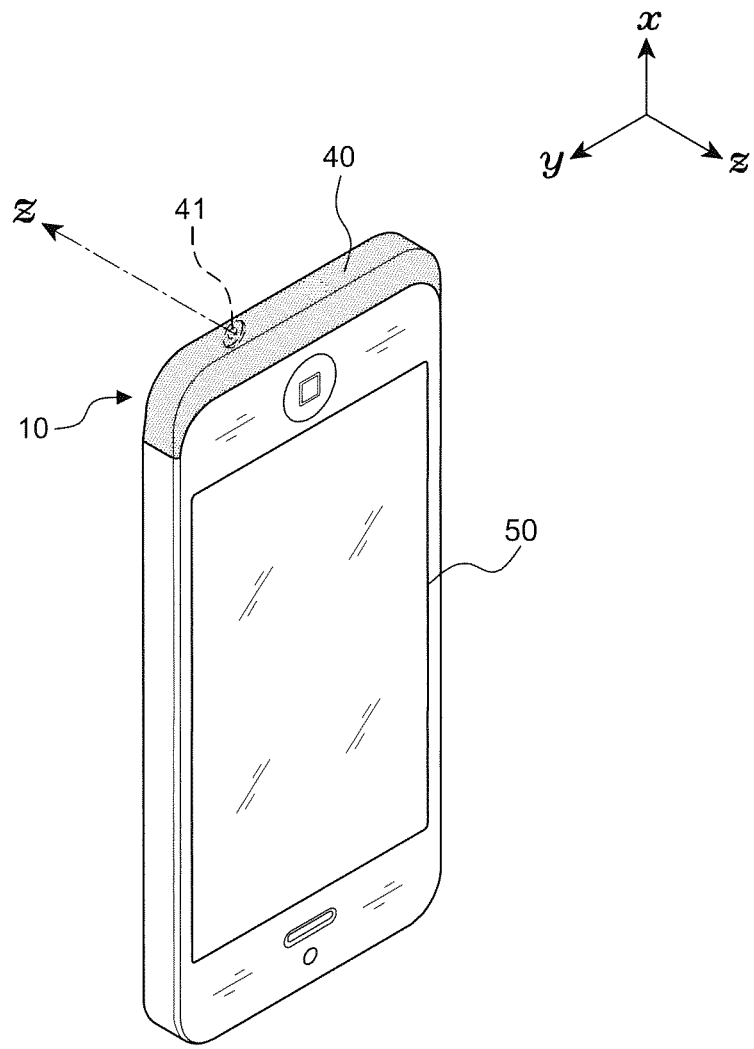
FIG. 4C is the other assembly perspective view of emitting device and smart mobile electronic device in accordance with the present invention.

With the reference to FIGS. 3B, 4A, and 4B, the light emitting module 30 in another applicable embodiment is set to be in a vertical direction with the connector 20, and the light-emitting hole 41 of the housing 40 is an L-type for the output light of the light emitting module 30 to be projected out in the Y-axis direction. The transmission port 51 set at a side of the smart mobile electronic device 50 is electrically connected to the connector 20 of the emitting device 10; thus, when combining the smart mobile electronic device 50 and the emitting device 10, the output light of the light emitting module 30 is projected out in the X-axis direction.

In the other embodiment as shown in FIGS. 2C, 3C, 3D, and 4C, the L-type light-emitting hole 41 has a reflector 42 of 45° inclination at a bend angle for the output light being 90° refracting to the predetermined direction and projecting out in the Z-axis direction. The transmission port 51 set at a tail end of the smart mobile electronic device 50 is electrically connected to the connector 20 of the emitting device 10; thus, when combining the smart mobile electronic device 50 and the emitting device 10, the output light of the light emitting module 30 is projected out in the Z-axis direction. Through the above three embodiments, the emitting element 10 is suitable for transmission port of all brands of smart mobile electronic devices, and the projected direction can be changed depends on the user's habit.

Based on the features disclosed, the light-emitting element 32 is a laser diode (LD) for the light emitting module 30 becoming a laser light module 30 and the emitting device 10 becoming a laser presenter 10 but it is not a limitation. For example, the light-emitting element 32 may be a visible light-emitting diode (Visible LED) or an infrared light-emitting diode (Infrared LED).

Under the framework of technical features disclosed, the present invention can be used with other detection or sensing element, thereby becoming detection, receiver or measuring devices, but it is the derived scope from the present invention and thus will not be described in details here. Accordingly, the following preferred embodiment of the emitting device as a laser presenter 10 is illustrated.

Figure 5:
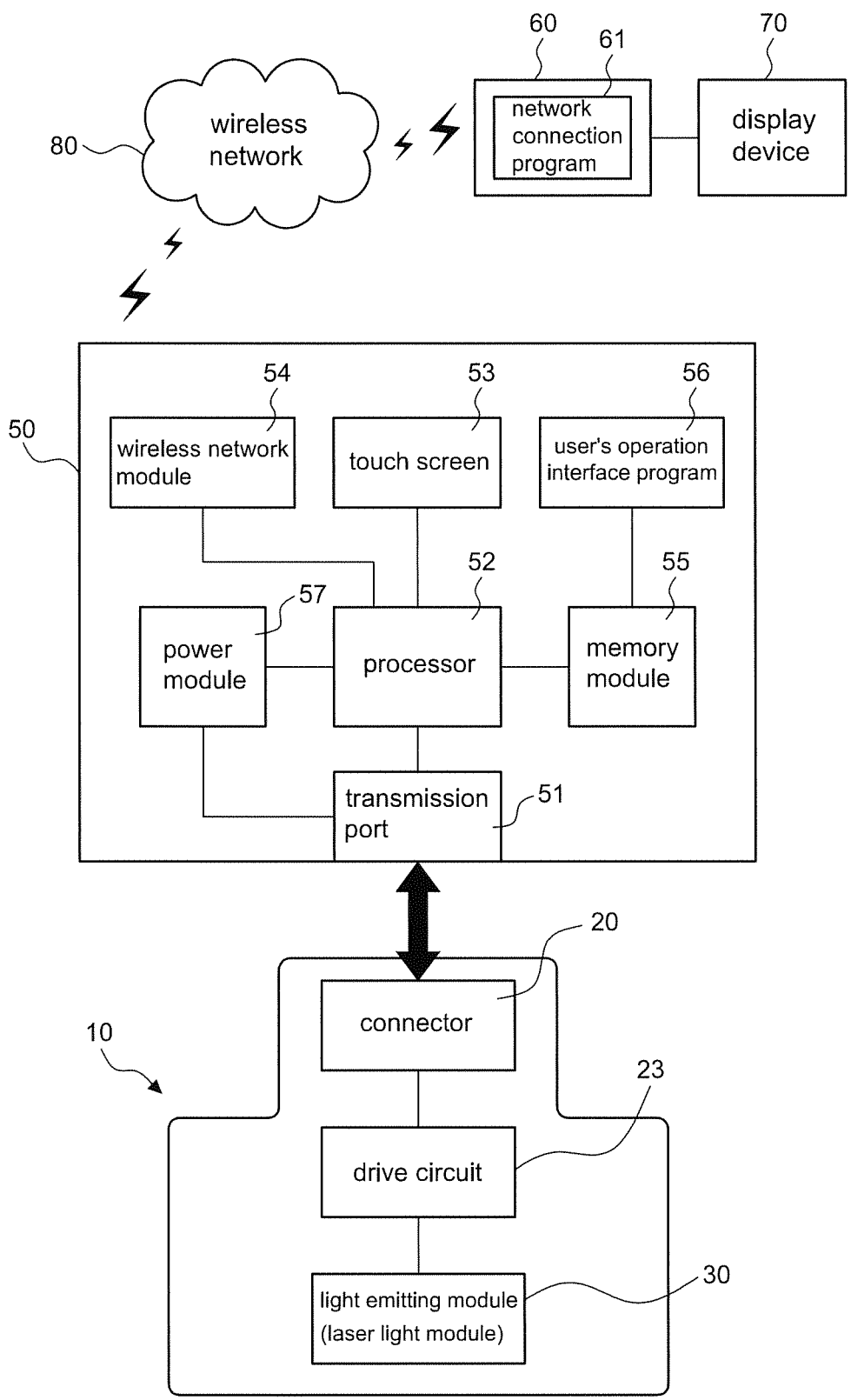
FIG. 5 is a schematic view of emitting device, smart mobile electronic device, and host in accordance with the present invention.

With the reference to FIG. 5, a laser presenter 10 using smart mobile electronic device as operation interface in which the smart mobile electronic device comprises a processor 52 provided for controlling the operation of the smart mobile electronic device 50; a touch screen 53 couple to the processor 52 for showing information and being the user's operation interface; a wireless network module 54 coupled to the processor 52; a memory module 55 coupled to the processor 52, saving a user's operation interface program 56, and showing the operation interface 56 on the touch screen 53; a power module 57 coupled to the processor 52 for providing the power to the smart mobile electronic device 50; a transmission port 51 coupled to the power module 57 and processor 52.

The present invention further comprises a host 60 such as a notebook computer having a network connection program 61 corresponding to the user's operation interface program 56 for the touch signal of the operation interface 56 to be transmitted to the host 60 by the wireless network module 54; the host 60 electrically connected to a display device 70 for the presentations showing on the display device 70 to be controlled by the operation interface 56. In the embodiment the laser presenter 10 and the host 60 under a wireless network 80 environment respectively provides the user's operation interface program 56 and the network connection program 61 for data transmission.

Figure 7:
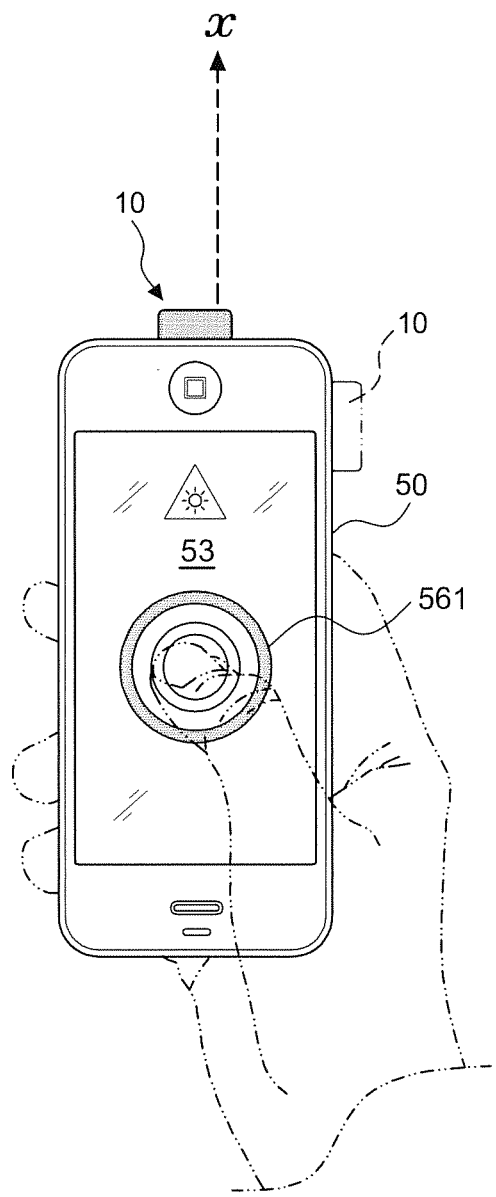
FIG. 7 is a schematic view of a touch switch interface of the present invention.
Figure 8:
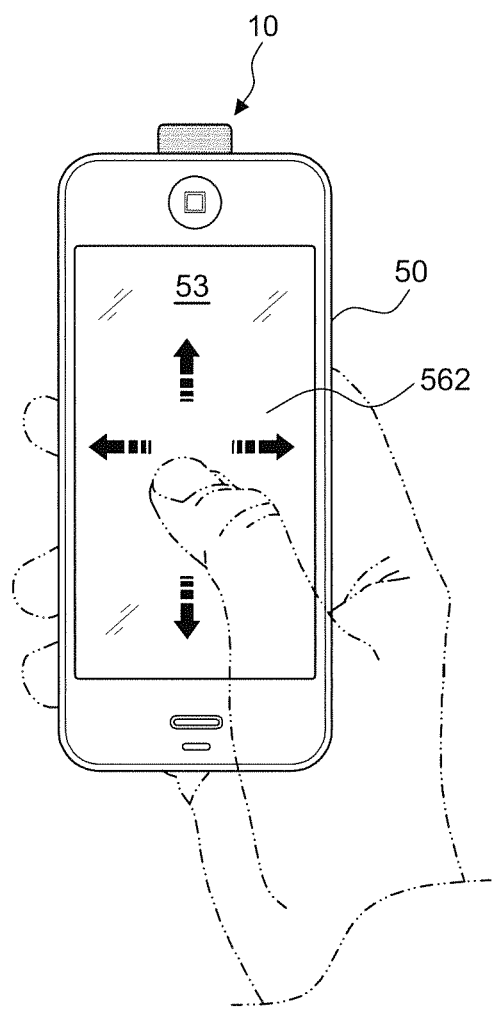
FIG. 8 is a schematic view of a virtual mouse interface of the present invention.

With the reference to FIGS. 7 and 8, the operation interface 56 includes a touch switch interface 561 and a virtual mouse interface 562, and the touch switch interface 561 and virtual mouse interface 562 can be switched by the touch screen 53.

Figure 6:
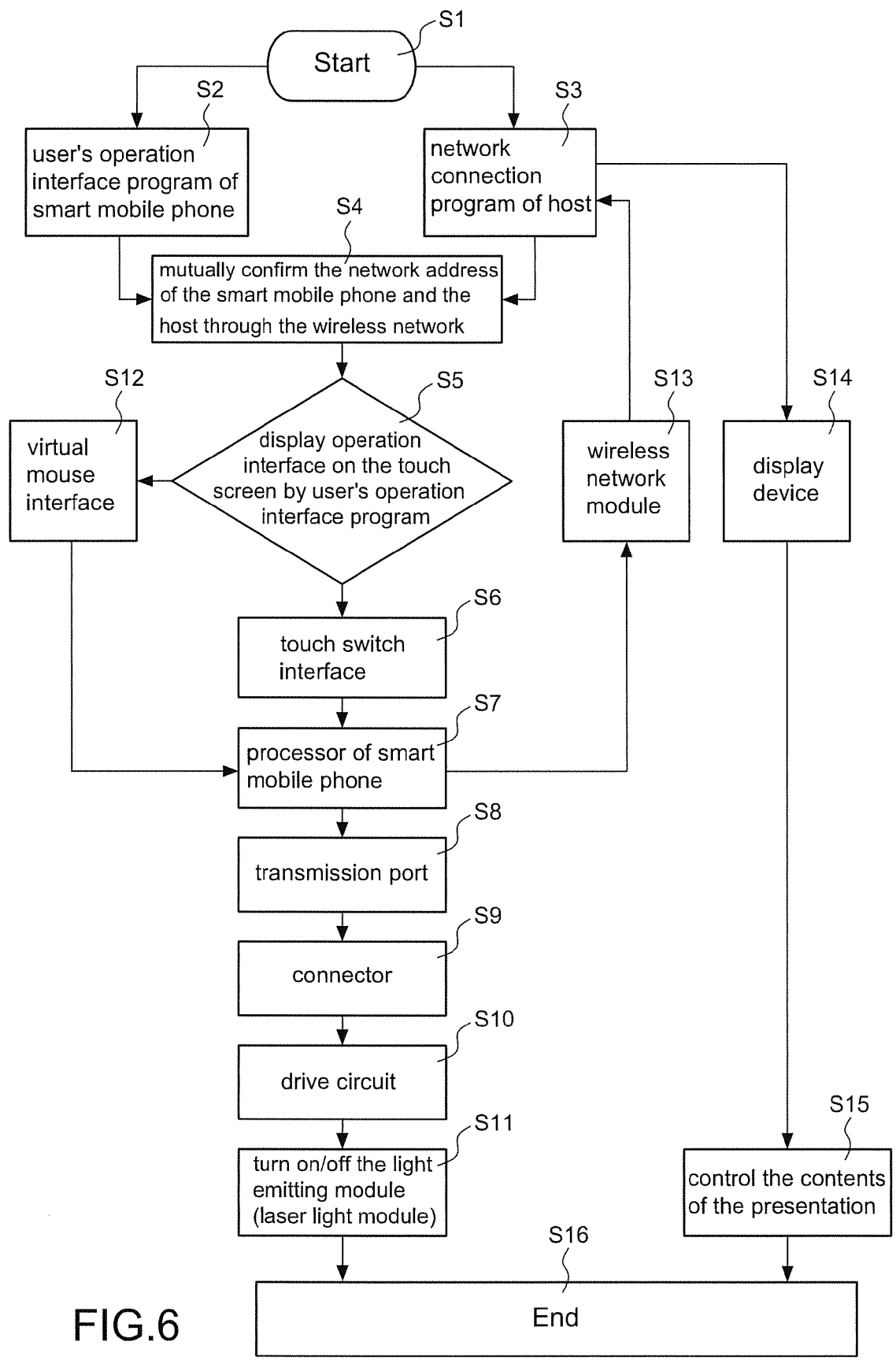
FIG. 6 is a flow diagram of emitting device, smart mobile electronic device, and host in accordance with the present invention.

FIG. 6 is a flow diagram of the laser presenter, smart mobile electronic device, and host wherein the smart mobile electronic device can be a smart mobile phone. The flow starts from step S1, and Steps S2 and S3 is to start the user's operation interface program 56 of the smart mobile phone, and the network connection program 61 of the host 60. Step S4 is to mutually confirm the network address of the smart mobile phone and the host 60 through the wireless network 80. Step S5 is to display the operation interface on the touch screen 53 by the user's operation interface program 56. If it is determined to proceed to step S6 of the operation interface being the touch switch interface 561, the touch switch signal is computed by the processor of the smart mobile phone at step S7 and is transmitted by the transmission port 51 of the smart mobile phone at step S8 to the connector 20 of the laser presenter 10 at step S9. The touch switch signal passes through the drive circuit 23 at step S10 to turn on/off the laser light module 30 at step S11, finally to end at step S16. If it is determined to proceed to step S12 of the operation interface being the virtual mouse interface 562, the virtual mouse signal is computed by the processor of the smart mobile phone at step S7, and is transmitted by the wireless network module 54 at step S13 to the network connection program 61 of the host 60 at step S3. The contents of the presentation is displayed on the display device 70 of the host 60 at step S14, and the virtual mouse signal is transmitted to the host 60 to control the contents of the presentation, finally to end at step S16.

Figure 9:
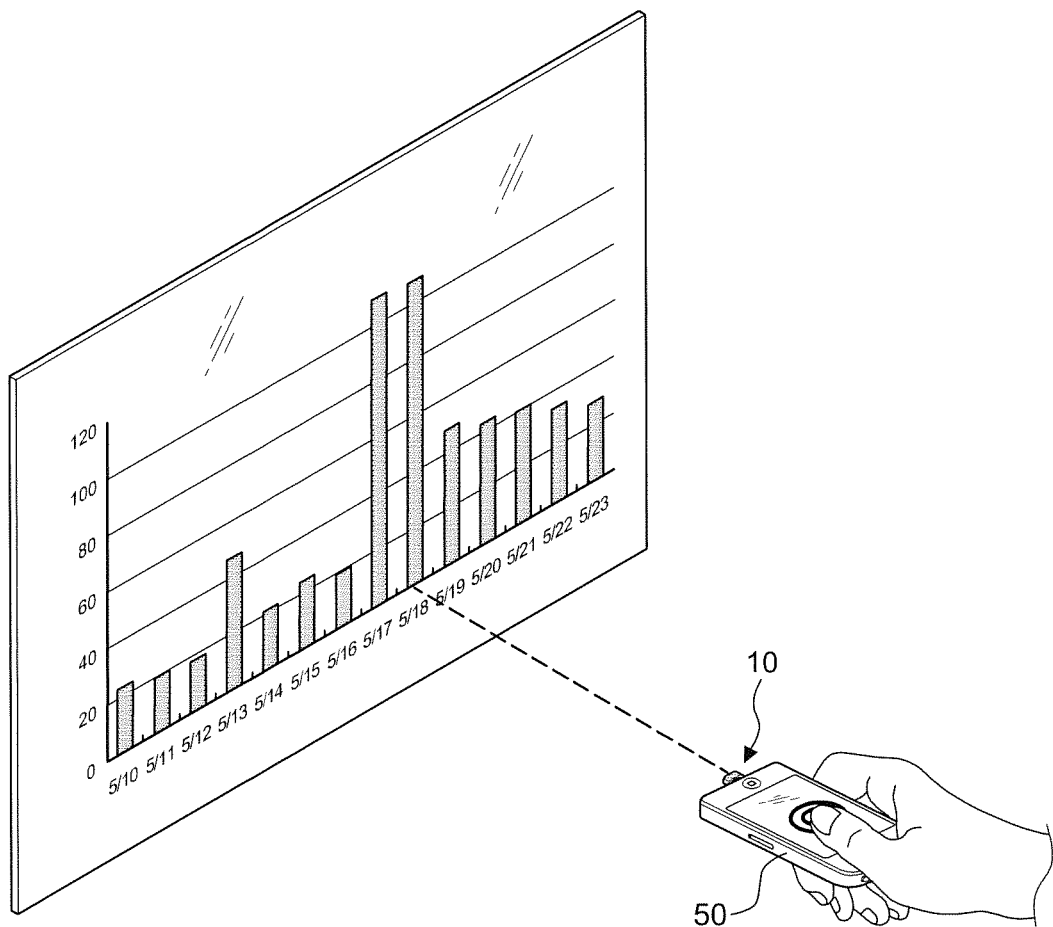
FIG. 9 is an application example of the present invention.

FIG. 9 is an application example. Through the operation interface, the smart mobile electronic device 50 allows the laser presenter 10 to become a light pen or laser pen which is very convenient for presentations or educational use.

With the aforementioned technical characteristics, the present invention has the following advantages and effects:

1. The combination of the laser presenter 10 and the smart mobile electronic device allows the laser presenter 10 to get power from the smart mobile electronic device 50 and to receive signal from the smart mobile electronic device 50.

2. Through the user's operation interface program 56, the smart mobile electronic device 50 is able to communicate with the laser presenter 10 or the host 60, the touch switch interface 561 is able to turn on/off the laser presenter 10, and the virtual mouse interface 562 is able to control the contents of the presentation.

3. Since the laser presenter 10 can be used as a dust cover to avoid moisture and dust entering in the smart mobile electronic devices.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An emitting device using smart mobile electronic device as operation interface, comprising:
    a connector having a circuit board, the circuit board having an electrical connection portion at a front end, and the electrical connection portion set to match specifications of a transmission port of a smart mobile electronic device for being inserted into the transmission port to get the power and signal;
    a light emitting module installed at a side of the circuit board;
    a drive circuit couple between the circuit board and light emitting module; and
    a housing coating the circuit board and light emitting module, the electrical connection portion of the connector exposed at an inner side of the housing, and one side of the housing having a light-emitting hole for output light of the light emitting module to be projected.

2. The emitting device using smart mobile electronic device as operation interface of claim 1, wherein the light emitting module includes:
    a hollow tube;
    a light-emitting element installed in the hollow tube, and the light-emitting element having several terminals at a bottom end;
    optical lens installed in the hollow tube and located in front of the light-emitting element; wherein the light-emitting element includes a laser diode (LD) or light emitting diode (LED), and the light emitting diode includes a visible light-emitting diode (Visible LED) and an infrared light-emitting diode (Infrared LED).

3. The emitting device using smart mobile electronic device as operation interface of claim 1, wherein the smart mobile electronic device may include mobile phones, tablet computers and PDA; wherein the transmission port may include USB series port, or Apple Lightning connector produced by Apple Inc.

4. The emitting device using smart mobile electronic device as operation interface of claim 1, wherein the drive circuit is set on the circuit board or in the light emitting module.

5. The emitting device using smart mobile electronic device as operation interface of claim 1, wherein the light emitting module is set to be in the same direction with the connector or to be in a vertical direction with the connector.

6. The emitting device using smart mobile electronic device as operation interface of claim 5, wherein the light-emitting hole of the housing is a linear type or L-type, and the L-type light-emitting hole has a reflector of 45° inclination at a bend angle for the output light being 90° refracting to the predetermined direction.

7. An emitting device using smart mobile electronic device as operation interface in which the smart mobile electronic device comprising:
- a processor provided for controlling the operation of the smart mobile electronic device;
- a touch screen couple to the processor for showing information and being the user's operation interface;
- a wireless network module coupled to the processor;
- a memory module coupled to the processor, saving a user's operation interface program, and showing the operation interface on the touch screen;
- a power module coupled to the processor for providing the power to the smart mobile electronic device;
- a transmission port coupled to the power module and processor;
- wherein the emitting device includes:
- a connector having a circuit board, the circuit board having an electrical connection portion at a front end, and the electrical connection portion set to match specifications of the transmission port for being inserted into the transmission port to get the power and signal;
- a light emitting module installed at a side of the circuit board;
- a drive circuit couple between the circuit board and light emitting module; and
- a housing coating the circuit board and light emitting module, the electrical connection portion of the connector exposed at an inner side of the housing, and one side of the housing having a light-emitting hole for output light of the light emitting module to be projected;
- whereby when the connector of the emitting device is electrically connected to the transmission port, the power module provides the power to the emitting device to turn on or off the light emitting module of the emitting device through the user's operation interface on the touch screen.

8. The emitting device using smart mobile electronic device as operation interface of claim 7, wherein the light emitting module is a laser light module for the emitting device becoming a laser presenter.

9. The emitting device using smart mobile electronic device as operation interface of claim 8, further comprising a host having a network connection program corresponding to the user's operation interface program for the touch signal of the operation interface to be transmitted to the host by the wireless network module; the host electrically connected to a display device for the presentations showing on the display device to be controlled by the operation interface.

10. The emitting device using smart mobile electronic device as operation interface of claim 9, wherein the operation interface includes a touch switch interface and a virtual mouse interface.

* * * * *